US010769941B2

(12) United States Patent
Nagpal et al.

(10) Patent No.: US 10,769,941 B2
(45) Date of Patent: *Sep. 8, 2020

(54) VEHICLE TURN DETECTION

(71) Applicant: Arity International Limited, Belfast (IE)

(72) Inventors: Varun Nagpal, Chicago, IL (US); Yasir Mukhtar, Des Plaines, IL (US); Jared S. Snyder, Chicago, IL (US); Connor Walsh, Lake Forest, IL (US)

(73) Assignee: Arity International Limited, Belfast (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,798

(22) Filed: Oct. 22, 2018

(65) Prior Publication Data

US 2019/0057602 A1    Feb. 21, 2019

Related U.S. Application Data

(63) Continuation of application No. 15/873,211, filed on Jan. 17, 2018, now Pat. No. 10,140,857, which is a
(Continued)

(51) Int. Cl.
*G08G 1/056* (2006.01)
*G06Q 40/08* (2012.01)
(Continued)

(52) U.S. Cl.
CPC ............. *G08G 1/056* (2013.01); *G06Q 40/08* (2013.01); *G08G 1/0112* (2013.01); *G08G 1/0129* (2013.01); *G08G 1/20* (2013.01)

(58) Field of Classification Search
CPC .... G08G 1/056; G08G 1/0112; G08G 1/0129; G08G 1/20; G06Q 40/08
(Continued)

(56) References Cited

U.S. PATENT DOCUMENTS 5,390,122 A     2/1995 Michaels et al.
5,469,158 A *  11/1995 Morita ................... G01C 21/28
                                                          340/988
(Continued)

FOREIGN PATENT DOCUMENTS

CN       104504531 A      4/2015
WO      2013107978 A1     7/2013

OTHER PUBLICATIONS

"Self-Driving Cars and Insurance" Insurance Information Institute, Jul. 2016, downloaded from <http://www.iii.org/issue-udpate/self-drifing-cars-and-insurance> on Aug. 30, 2016.
(Continued)

*Primary Examiner* — Kerri L McNally
(74) *Attorney, Agent, or Firm* — Banner & Witcoff, Ltd.

(57) ABSTRACT

An turn detection system is configured to determine headings or a course of a vehicle over a period of time and evaluate whether the vehicle has registered a turn based on these headings/course. In some arrangements, upon detecting a turn, sensor data may be collected to determine one or more characteristics or attributes of the turn. Such data may indicate a loss event associated with the turn and be used to calculate a probability or risk of loss given the various characteristics of the turn. These probabilities may further be applied to determine various costs and premiums.

20 Claims, 6 Drawing Sheets

Related U.S. Application Data continuation of application No. 15/496,336, filed on Apr. 25, 2017, now Pat. No. 9,905,127, which is a continuation of application No. 15/251,556, filed on Aug. 30, 2016, now Pat. No. 9,666,067.

(51) Int. Cl.
*G08G 1/01* (2006.01)
*G08G 1/00* (2006.01)

(58) Field of Classification Search
USPC .......................................... 340/935
See application file for complete search history.

(56) References Cited

U.S. PATENT DOCUMENTS

| | | | |
|---|---|---|---|
| 5,642,106 A | 6/1997 | Hancock et al. | |
| 6,014,610 A | 1/2000 | Judge et al. | |
| 6,178,368 B1 | 1/2001 | Otake | |
| 6,502,033 B1 * | 12/2002 | Phuyal | G01C 21/30 340/988 |
| 8,548,739 B2 | 10/2013 | Lee et al. | |
| 8,694,224 B2 | 4/2014 | Chundrlik, Jr. et al. | |
| 8,781,669 B1 | 7/2014 | Teller et al. | |
| 8,930,231 B2 | 1/2015 | Bowne et al. | |
| 9,127,946 B1 | 9/2015 | Menon et al. | |
| 9,147,353 B1 | 9/2015 | Slusar | |
| 9,176,500 B1 | 11/2015 | Teller et al. | |
| 9,666,067 B1 * | 5/2017 | Nagpal | G08G 1/056 |
| 9,905,127 B1 * | 2/2018 | Nagpal | G08G 1/056 |
| 10,140,857 B2 * | 11/2018 | Nagpal | G08G 1/056 |
| 2004/0133346 A1 | 7/2004 | Bye et al. | |
| 2004/0236476 A1 | 11/2004 | Chowdhary | |
| 2011/0117903 A1 | 5/2011 | Bradley | |
| 2011/0125402 A1 | 5/2011 | Mitsugi et al. | |
| 2014/0142786 A1 * | 5/2014 | Huang | B60Q 1/40 701/2 |
| 2014/0257863 A1 | 9/2014 | Maastricht et al. | |
| 2015/0006099 A1 | 1/2015 | Pham et al. | |
| 2016/0086285 A1 | 3/2016 | Jordan Peters et al. | |
| 2016/0171521 A1 | 6/2016 | Ramirez et al. | |
| 2016/0189323 A1 * | 6/2016 | Wakabayashi | G08G 1/164 705/325 |

OTHER PUBLICATIONS

Sep. 29, 2017—(WO) International Search Report—PCT/US17/49120.
Mar. 18, 2020—(EP) Extended Search Report—App. No. EP17847368.

* cited by examiner

VEHICLE TURN DETECTION

CROSS-REFERENCE TO RELATED APPLICATIONS

The present application is a continuation of co-pending U.S. application Ser. No. 15/873,211, filed Jan. 17, 2018, which is a continuation of co-pending U.S. application Ser. No. 15/496,336, filed Apr. 25, 2017, issued as U.S. Pat. No. 9,905,127 on Feb. 27, 2018, which is a continuation of co-pending U.S. application Ser. No. 15/251,556, filed Aug. 30, 2016, issued as U.S. Pat. No. 9,666,067 on May 30, 2017 and entitled "Vehicle Turn Detection," the contents of which are hereby incorporated by reference in its entirety for all purposes.

TECHNICAL FIELD

Various aspects of the disclosure relate to detection of a vehicle turn. More specifically, aspects of the disclosure relate to determining whether a vehicle has made a turn and characteristics of the turn.

BACKGROUND

Current navigation systems generally determine a vehicle's position and plot those positions against a predefined map. Accordingly, some existing navigation systems determine when a vehicle turns onto a new path/road based on the position of the vehicle rather than a determination of the vehicle's heading or course or any other characteristics of the turn. Moreover, in some instances, certain types of vehicle movements, or particular characteristics thereof, may have a high correlation with other events such as accidents, traffic violations and the like. However, current systems do not generate such correlations nor are they configured in a predictive manner.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein provide a system, apparatus, method and/or computer-executable instructions for detecting vehicle movements such as turns in a real-time, on-demand or as-you-go manner. Additionally, various aspects provide the recordation or other determination of vehicle, driver and vehicle movement characteristics and information. Using such characteristics and information, a system may generate correlations between the vehicle movements and other events such as a risk of loss. These correlations, in aggregate across multiple vehicles and instances, may lead to the creation of a database, thereby providing a probability or risk of a particular event given a specified vehicle movement. Such correlations may be used in a variety of contexts including warning drivers of unsafe maneuvers, calculating insurance premiums (risks), peer monitoring of events and the like.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Various aspects described herein may be embodied as a method, an apparatus, a system, or a computer readable medium. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
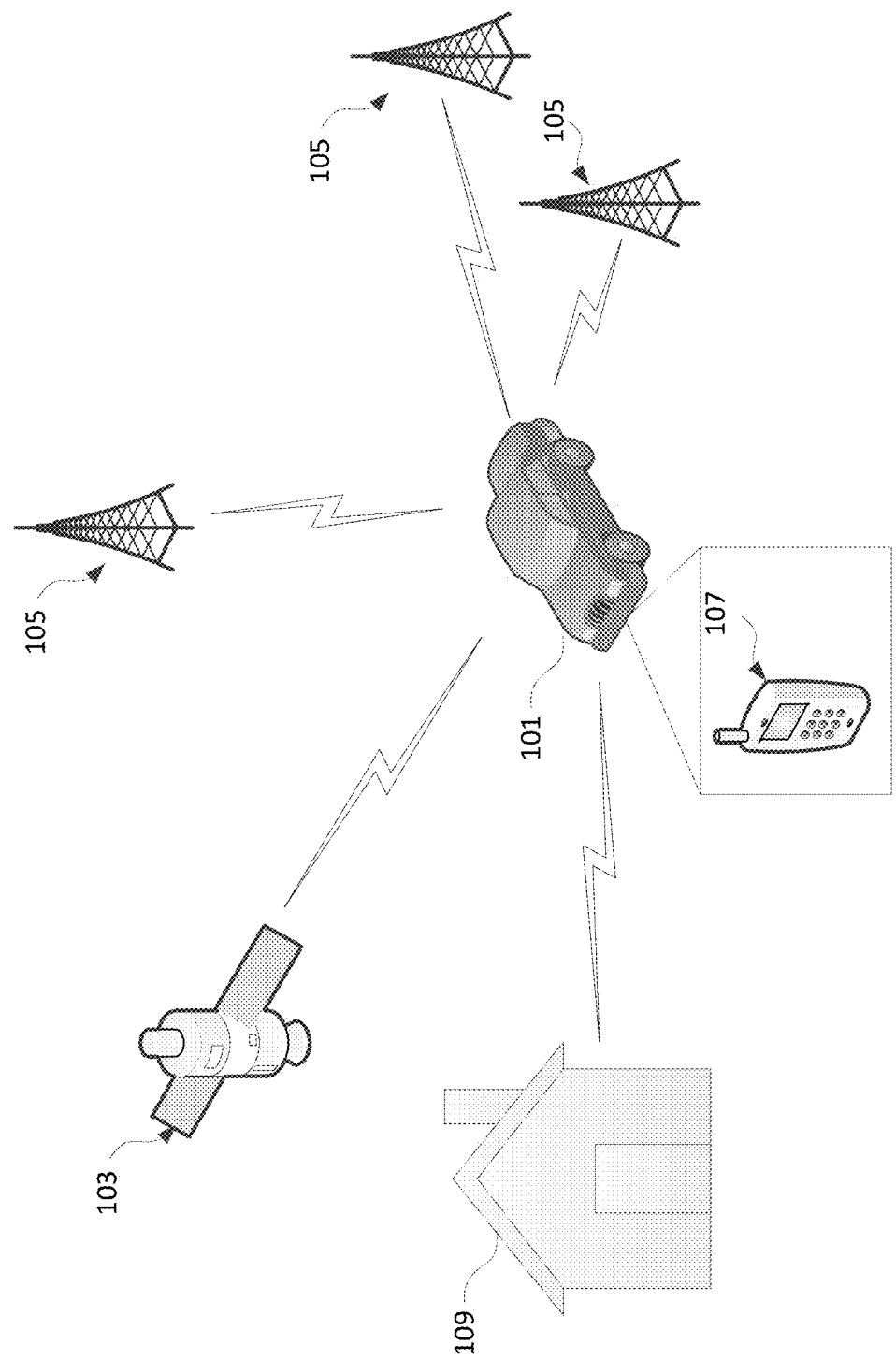
FIG. 1 illustrates a system for determining vehicle heading/course and detecting turns according to one or more aspects described herein.

FIG. 1 illustrates a system in which various positioning systems may track a location and heading/course of a vehicle to determine whether the vehicle is executing or has executed a turn as well as to derive other driving characteristics. A course, as described herein, may generally relate to a single heading or a series of multiple headings. In one example, vehicle 101 may include one or more transceivers that are configured to communicate with a global positioning system (GPS) satellite 103, which may include the receipt of positioning data. Through the positioning information received from satellite 103 through the receiver, a computing device of vehicle 101 may determine the location and heading/course of the vehicle 101. In some instances, the vehicle computer (e.g., vehicle on-board computing device) may include pre-stored maps or maps obtained on-demand. The position information may then be used to graphically illustrate a position of the vehicle 101 within the maps (e.g., displaying a picture of a vehicle along road 109). In some examples, the position information and associated map may be displayed on a display of a mobile device of a user, on a display within a vehicle and associated with an on-board vehicle computing device, and/or other display devices.

According to other embodiments, a vehicle 101 or vehicle computing device may obtain positioning information through cellular or wireless information. In one example, the computing device or vehicle 101 may include a wireless or cellular transceiver configured to communicate with cellular or wireless access points such as access points 105. The wireless or cellular transceiver may include a user's mobile device 107 that is linked to the vehicle's internal communication and computing systems. In some arrangements, a mobile device such as device 107 may be integrated as a hardware component of the vehicle (rather than a separable device of a user). Using a communication interface such as device 107, vehicle 101 may perform triangulation calculations to determine the vehicle's position based on data received from access points 105 and/or from satellite 103. Triangulation may include measuring the signal strengths between vehicle 101 (or other communication device associated therewith) and each of access points 105 and triangulating those strengths to identify a position of the vehicle 101. In other arrangements, wireless local or wide area networks (WLAN or WAN's) may also be used to determine a vehicle's location. For example, if a vehicle is accessing a network through a Wi-Fi access point at a home 109 having a maximum range of 200 feet, the vehicle system 101 may determine the location of the Wi-Fi access point (e.g., by querying the access point or otherwise requesting location data) and subsequently identify its own location as within a radius of 200 feet of the location of home 109. Access points may be provided at a variety of locations not limited to homes, communication towers, and/or satellites.

GPS, cellular and other wireless network information may be used in combination to further refine or otherwise confirm positioning determinations of the vehicle 101 or of other devices. For example, in some areas, a GPS signal may be weak and thus provide a less granular determination of the location of vehicle 101. In such an instance, cellular triangulation may be used to further refine the location determination to provide a more particular position of vehicle 101. In some arrangements, the various types of positioning sources may be ranked such that if a first priority system (e.g., GPS) is unavailable or is providing information with a level of confidence lower than desired (e.g., signal is weaker than a threshold signal strength or resolution is lower than a threshold resolution), a device may go to a second priority system (e.g., cellular towers such as access points 105) and so on. In other examples, a turn detection system may increase a data collection rate from the first priority system if the first priority system is demonstrating weaker signal strength or is otherwise providing information with a lower level of confidence. The increased data collection rate may help to confirm or verify other pieces of data within the collection stream. Even when a turn detection system switches to a second priority system, the turn detection system may continue to monitor (e.g., collect data from) the first priority system to determine whether the resolution or strength of signal has improved. The ranking or priority may be designated by the turn detection system, a third party (e.g., an insurance company) and/or by the user. Data may be collected from multiple systems including both first and second priority location determination systems. The data may then be tagged with a reliability flag or attribute indicating whether the data from a particular system was collected with sufficient confidence.

Beyond the devices described above that may be associated with vehicle 101, vehicle 101 may further include one or more sensors (not shown) to sense vehicle or driving characteristics. Such sensors may include gyroscopes, accelerometers, cameras, motion detectors, light sensors, infrared sensors, impact sensors, thermometers and the like and/or combinations thereof. The vehicle 101 or other devices may use these sensors in a variety of manners, including to record images of vehicle events (e.g., traffic light status, turns, rapid acceleration, rapid deceleration, abnormal stops, swerving, hard braking, etc.), determine a severity of a crash (e.g., impact force, speed prior to impact, speed of deceleration), determine an external temperature of the area in which the vehicle is traveling, determine a time of day, determine presence and/or type of precipitation, determine a visibility (e.g., based on precipitation detectors and/or light detectors) and the like. Moreover, sensors of one vehicle may be used to help determine driving characteristics of another vehicle. For example, in the event of a crash of a first vehicle, the sensors, such as a camera, may be activated to help determine characteristics of that crash event, such as a traffic light status. The lack or disabling of sensors of the first vehicle may dictate or precipitate the activation and use of the sensors of the second other vehicle. In one arrangement, the turn detection system, upon detecting a turn event or loss event, may determine whether the vehicle includes various sensors. Different types of events may require different types of sensors. If not, the turn detection system may seek another vehicle in the vicinity (e.g., predefined proximity) with the requisite sensors, and activate or otherwise request data from those sensors. Aspects described herein may use or implement a variety of other configurations using such sensors.

Figure 2:
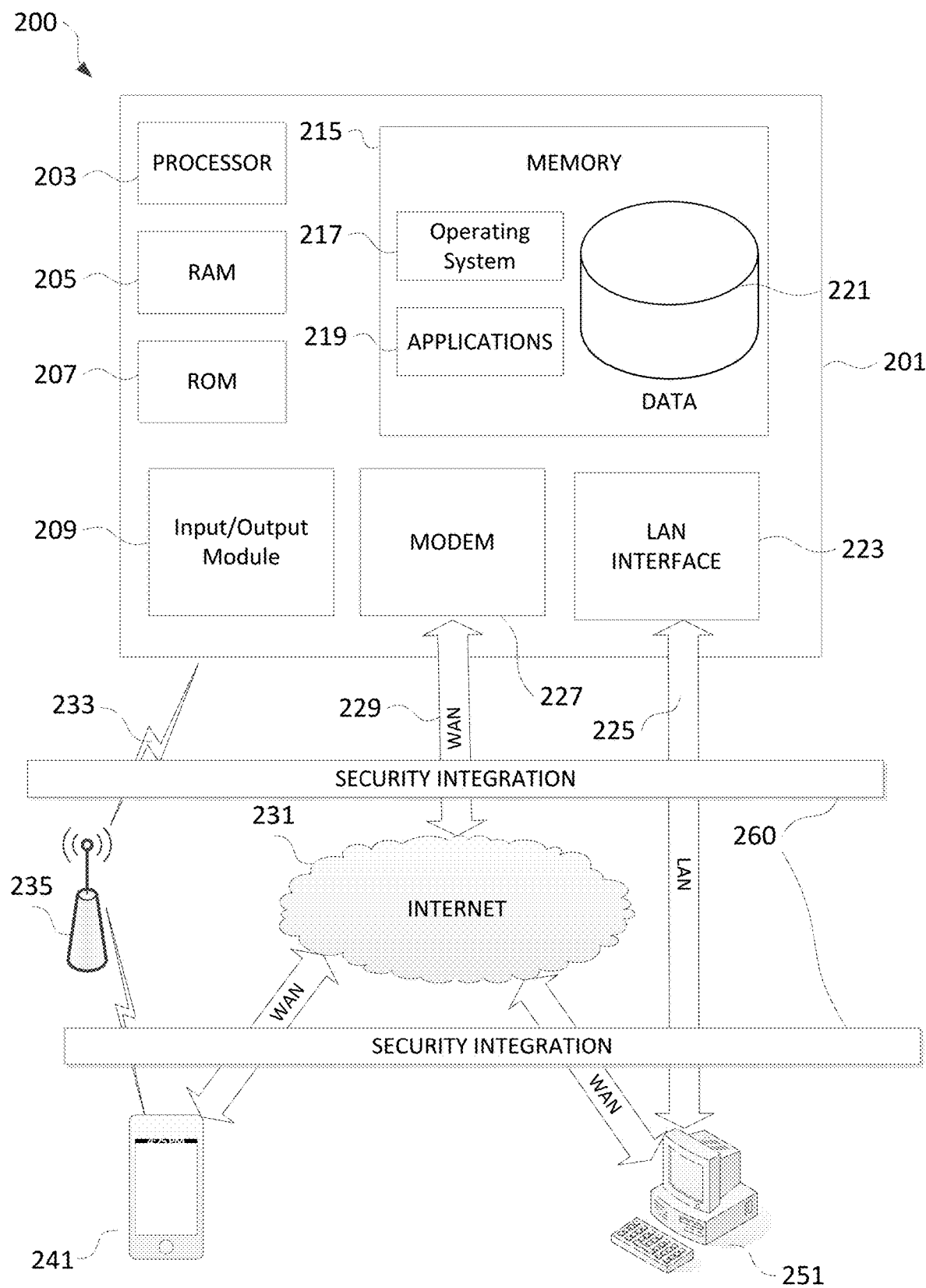
FIG. 2 illustrates an example computing device configured to detect turns, evaluate loss events and risk of loss according to one or more aspects described herein.

FIG. 2 illustrates a block diagram of a computing device (or system) 201 in a computer system 200 that may be used according to one or more illustrative embodiments of the disclosure. In one example, the computing device, sensors, positions systems and/or access points described in FIG. 1 may include components and configurations of device 201. With continued reference to FIG. 2, the device 201 may have a processor 203 for controlling overall operation of the device 201 and its associated components, including RAM 205, ROM 207, input/output module 209, and memory 215. The computing device 201 may correspond to any of multiple systems or devices described herein, such as personal mobile devices, satellite, cellular or other wireless access points, ground vehicle-based computing devices including servers and home computing devices and other various devices. These various computing systems may be configured individually or in combination, as described herein, for determining a heading or course and/or position of a vehicle to detect turns (or other movements) of the vehicle. The systems may further collect vehicle and event data to determine and identify correlations between vehicle events or characteristics such as between certain types of vehicle movements and accidents.

Input/Output (I/O) 209 may include a microphone, keypad, touch screen, and/or stylus through which a user of the computing device 201 may provide input, and may also include one or more of a speaker for providing audio output and a video display device for providing textual, audiovisual and/or graphical output. Software may be stored within memory 215 and/or storage to provide instructions to processor 203 for enabling device 201 to perform various actions. For example, memory 215 may store software used by the device 201, such as an operating system 217, application programs 219, and an associated internal database 221. The various hardware memory units in memory 215 may include volatile and nonvolatile, removable and non-removable media implemented in any method or technology for storage of information such as computer-readable instructions, data structures, program modules or other data. Memory 215 also may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Processor 203 may include a single central processing unit (CPU), which may be a single-core or multi-core processor (e.g., dual-core, quad-core, etc.), or may include multiple CPUs. Processor(s) 203 may have various bit sizes (e.g., 16-bit, 32-bit, 64-bit, 96-bit, 128-bit, etc.) and various processor speeds (ranging from 100 MHz to 5 Ghz or faster). Processor(s) 203 and its associated components may allow the system 201 to execute a series of computer-readable instructions for, for example, processing sensor information, performing triangulation, calculating headings/courses of a vehicle, determining whether a turn has been made, performing network communications, calculating vehicle characteristics (speed, impact, rate of turn, deceleration, acceleration, etc.) and the like.

A computing device such as device 201 (e.g., a personal mobile device, vehicle-based system, insurance server, etc.) may operate in a networked environment 200 supporting connections to one or more remote computers or devices (e.g., satellites, remote servers, drones, vehicles, personal devices). The network connections depicted in FIG. 2 include a local area network (LAN) 225 and a wide area network (WAN) 229, and a wireless telecommunications network 233, but may also include other networks. When used in a LAN networking environment, the computing device 201 may be connected to the LAN 225 through a network interface or adapter 223. When used in a WAN networking environment, the device 201 may include a modem 227 or other means for establishing communications over the WAN 229, such as network 231 (e.g., the Internet). When used in a wireless telecommunications network 233 (e.g., cellular or otherwise), the device 201 may include one or more transceivers (e.g., cellular, digital, etc.), digital signal processors, and additional circuitry and software for communicating with wireless computing devices 241 and 251 (e.g., mobile phones, portable customer computing devices, vehicle-based computing devices and systems, etc.) via one or more network devices 235 (e.g., base transceiver stations) in the wireless network 233.

Also illustrated in FIG. 2 is a security layer 260, through which communications may be sent and managed between the device 201 and remote devices. The security layer 260 may comprise one or more separate computing devices, such as web servers, authentication servers, and/or various networking components (e.g., firewalls, routers, gateways, load balancers, etc.), having some or all of the elements described above with respect to the computing device 201. In other examples, security layer 260 may correspond to software or hardware (e.g., encryption) within the device 201. Encryption protocols may also be implemented through security layer 260. Types of encryption may include public/private key pairs, Advanced Encryption Standard (AES) algorithms, Data Encryption Standard (DES) algorithms and other symmetric and asymmetric encryption protocols. Additionally or alternatively, security layer 260 may provide virtual private network (VPN) connections (e.g., using SSL or the like) through which certain types of data is sent to and received from other devices in the system.

Although not shown in FIG. 2, various elements within memory 215 or other components in system 100, may include one or more caches, for example, CPU caches used by the processing unit 203, page caches used by the operating system 217, disk caches of a hard drive, and/or database caches used to cache content from database 221. For embodiments including a CPU cache, the CPU cache may be used by one or more processors in the processing unit 203 to reduce memory latency and access time. In such examples, a processor 203 may retrieve data from or write data to the CPU cache rather than reading/writing to memory 215, which may improve the speed of these operations. In some examples, a database cache may be created in which certain data from a database 221 (e.g., a database of property data, user data, user/owner interests or characteristics, etc.) is cached in a separate smaller database on an application server separate from the database server (e.g., at a personal mobile device, insurance processing device, or intermediary network device or cache device, etc.). For instance, in a multi-tiered application, a database cache on an application server can reduce data retrieval and data manipulation time by not needing to communicate over a network with a back-end database server.

The network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in home maintenance monitoring and reward system components described herein may be configured to communicate using any of these network protocols or technologies.

In existing systems, GPS and other positioning systems have largely been used to provide navigation guidance. Such navigation systems simply recognize movements of the vehicle based on a point position of the vehicle and whether that position matches or maps to a predefined/anticipated route. For example, the navigation system will determine whether a vehicle has moved from a North-South road to an East-West road based on the point position changes of the vehicle. As such, existing navigation systems generally do not perform real-time, on-demand or as-you-go type detection/differentiation of a turn or other types of vehicle movements. However, as described herein, using this movement data (e.g., turn detection or differentiation between types of vehicle movements), a system may identify correlations between other types of attributes, characteristics and the like and the vehicle movements. For example, a system may identify correlations between risk of an accident or risk of loss based on the types of movement the vehicle makes, such as turns. Once such correlations are determined, a system may analyze a driver's behavior through vehicle movements to determine a risk of loss associated with that driver.

Figure 3:
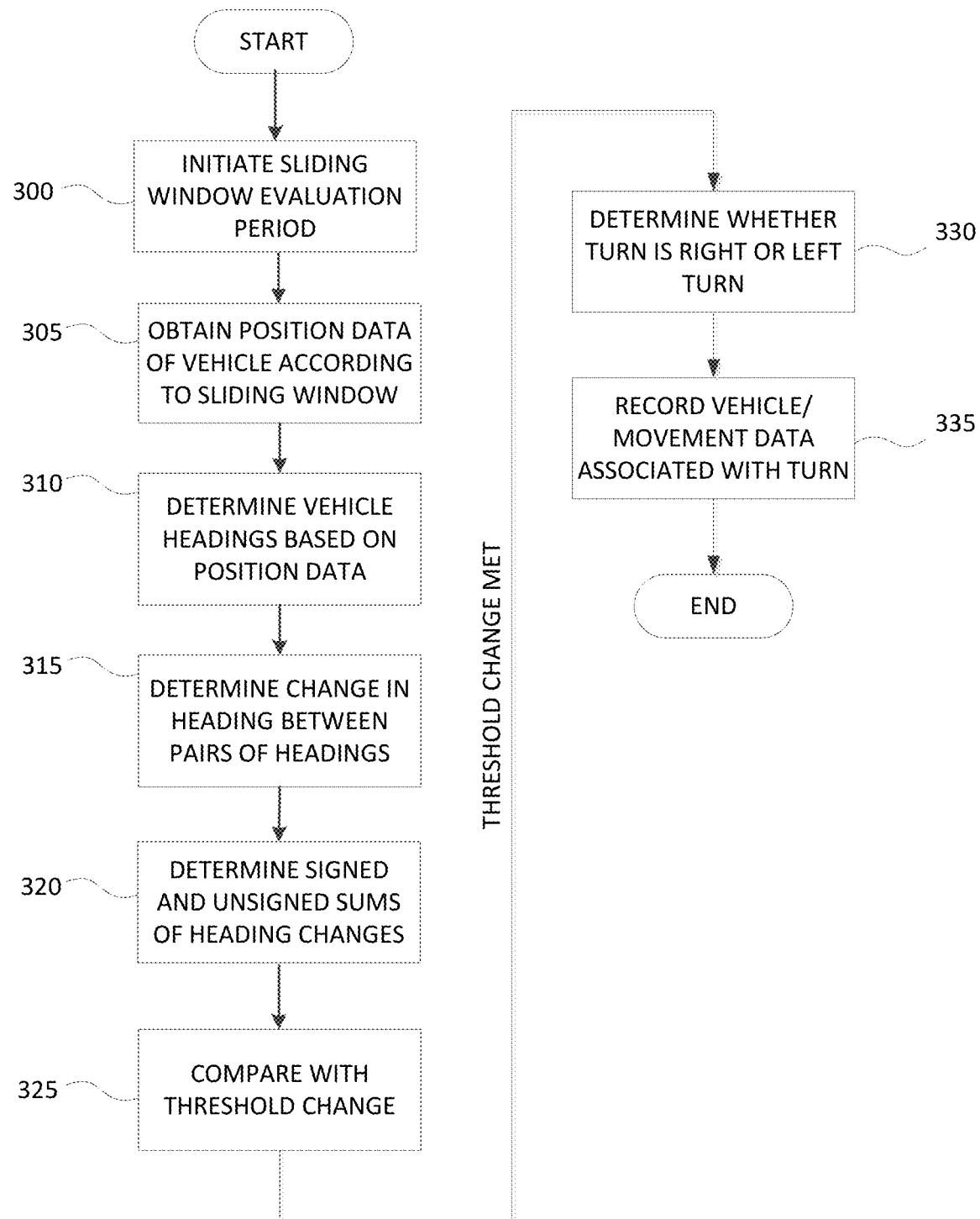
FIG. 3 is a flowchart illustrating an example process for detecting a vehicle turn according to one or more aspects described herein.

Various methods may be used to perform real-time or on-demand detection of turns. One process includes determining the heading/course of the vehicle at predefined intervals for a specified period of time. FIG. 3 illustrates such an example process. In step 300, for instance, a computing device, whether in the vehicle or remote from the vehicle, may initiate a sliding window as an evaluation period to determine whether a particular vehicle movement such as a turn has occurred. This initiation of a sliding window may be triggered by a variety of events such as the start of the ignition, a power-up event, user instruction, shifting to a particular gear (e.g., drive), reaching a particular speed threshold and the like and/or combinations thereof. The sliding window may be defined to be various lengths. In addition, the sliding window may be defined by a data collection rate. The data collection rate defines not only the amount of positions that are determined, but also the rate at which each position is determined. In one example, the sliding window is 13 seconds long with a data collection rate of 1 second (position is determined every second for 13 seconds). Based on empirical evidence, 13 seconds with a 1 second data collection rate provides an optimal time period for evaluating movements of the vehicle to detect turn events. Other periods of time or data collection rates may decrease the accuracy of detection applying the method discussed in FIG. 3, by either collecting too much data or too little data. However, other time periods and/or data collection rates may be used for the sliding window (less or greater than 13 seconds, less than or greater than 1 sec, etc.). In some instances, a system may compensate for any increase in inaccuracy based on longer or shorter evaluation windows and/or longer or shorter data collection rates.

In step 305, the system may subsequently start to obtain position information for the vehicle according to the parameters of the sliding window, such as the data collection rate. As noted herein, the position information may be obtained from a variety of sources, including from GPS satellites, cell towers, Wi-Fi access points and the like. From the position information, the system may determine a heading/course of the vehicle in step 310 for each position determined for the vehicle. One method of determining the vehicle heading/course is to determine a vector between an immediately previous position and the currently obtained position. In some arrangements, other information from sensors such as gyroscopes and accelerometers may be used to supplement this determination of the heading/course. In a particular example, the amount of turning of the steering wheel may also be used to confirm or support a heading/course determination. For example, the steering wheel direction may be mapped to a heading/course of the vehicle or an amount of change in heading/course. Accordingly, such information may supplement a heading/course determination using GPS or triangulation. The heading/course may be defined in a variety of ways, including using magnetic north as a reference vector or using another predefined reference vector, and may be represented as an angle relative to the reference vector.

In step 315, a difference between each pair of immediately adjacent (time-wise) headings within the sliding window is calculated. The system may calculate two differences in heading/course, an unsigned difference (e.g., absolute value) as well as a signed difference. An unsigned difference may correspond to a sum of the absolute values of the headings, while an signed different may correspond to a sum of the signed values of the headings. Once the differences have been determined for each pair of immediately adjacent headings within the sliding window, the system may then determine both an unsigned sum of the heading differences as well as a signed sum in step 320. Using the unsigned sum, the system may determine whether a turn has occurred based on whether the sum exceeds a predefined threshold angle in step 325. In one example, the threshold angle may be 58°. As such, if the unsigned sum is 58° or higher, the system may determine that the vehicle made a turn. On the other hand, if the unsigned sum is less than 58°, the system might not identify the movement as a turn. According to some empirical studies, use of a 58° threshold provides a high level of accuracy in determining whether a vehicle has registered a turn. Of course, other thresholds may be used. In some instances, if the unsigned sum is less than the turn threshold, but higher than a second threshold, the system may use other data to confirm whether the movement corresponds to a turn. Additionally, the system may further determine whether the turn is a right turn or a left turn based on the signed sum in step 330 if a turn is detected according to step 325. For example, a negative signed sum may indicate a left turn while a positive signed sum may indicate a right turn. In some examples, if a turn is not detected, the process may return to step 315 to process a new window of vehicle movement data. Note the steps of FIG. 3 may be constantly performed irrespective of whether a turn has been detected.

If the system detects a turn, the system may further record data in association with the turn in step 335. The recorded data may include sensor information including speed, rate of turn, deceleration, acceleration, standard deviation of angle change, circular variance, amount or number of direction changes, accuracy of the location (e.g., accuracy of GPS or triangulation), moments of change, derivative of change in sign, whether an airbag deployed, whether a collision occurred, whether a turn signal was used, whether honking was detected and the like and/or combinations thereof. The system may constantly (e.g., continuously) or periodically collect sensor data irrespective of whether a turn is detected. However, this data might only be stored to long-term storage and/or in association with a turn event when a turn is detected. Additionally, only a portion of the collected data may be stored. For example, sensor data (or other data) for a predefined period within, overlapping or surrounding the turn event may be placed in long-term storage and/or associated with the turn event. Some systems may store a window of data that includes the time window in which the turn was detected as well as a previous and subsequent period (e.g., 5 seconds, 10 seconds, 1 second, 1 minute, etc.). Alternatively, the data storage window may correspond to the turn event window as well as a subsequent period (e.g., 5 seconds, 30 seconds, 1 minute, 10 minutes, etc.). Other data may also be stored in association with the turn event, including driver characteristics (e.g., age, driving experience, accident history, etc.) and vehicle characteristics (e.g., make, model, year, safety features, engine type, horsepower, etc.).

Turn detection may also be integrated into other vehicle functions such as speed control, turn signaling, headlight aiming and the like. In one example, upon detecting a turn, the system may employ speed control to cap the speed with which a vehicle may make a turn. Alternatively or additionally, the system may modify headlight direction based on the heading of the vehicle upon detection of a turn. Still further, a turn signal may automatically activate if a turn is detected. A variety of other controls may be integrated with the turn detection system and process.

In one or more arrangements, data may be collected from sensors and other devices from other vehicles in a vicinity of the vehicle for which movement is being monitored and evaluated. In one example, when a turn is detected for a first vehicle, data from one or more second vehicles in a specified vicinity (e.g., a radius of 500 feet) may be queried for additional data, such as image/video/audio data, environmental information (temperature, weather, road slickness, humidity, etc.), traffic conditions, speed (of surrounding traffic or of the vehicle-in-question) and the like and/or combinations thereof. While in some systems, the other vehicles may collect driving/movement information at all times or otherwise irrespective of the turn event of the first vehicle, in other systems, the other vehicles may be triggered to begin recording data. Moreover, a system may request particular types of data from the other vehicles. Accordingly, the other vehicles might only activate sensors or otherwise record the data being requested. In systems where the vehicle might be collecting data irrespective of the detected movement event of the first vehicle, the other vehicles might only provide the requested data (e.g., types of data, periods of time for the data, etc.). In other instances, the other vehicles might provide all collected data for parsing/filtering by the requesting device or system. The data may be requested and sent to either a third party system or to the vehicle (or device associated therewith).

Figure 4A:
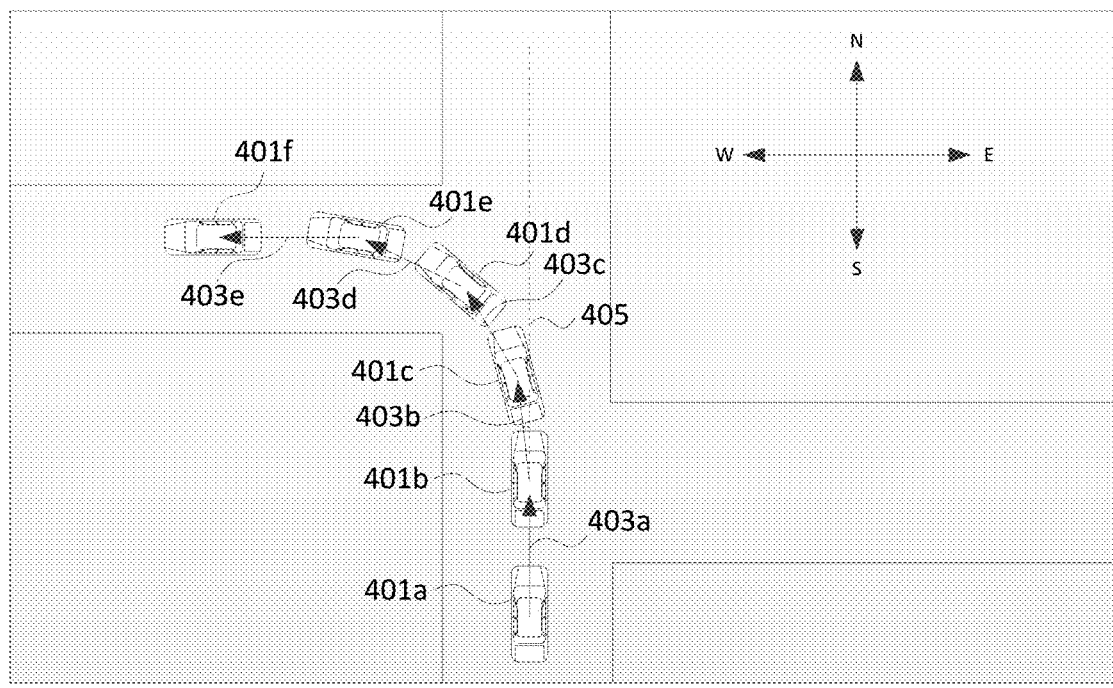
FIG. 4A illustrates the determination of a vehicle's position and a heading/course vector using the position information according to one or more aspects described herein.

FIG. 4A illustrates the manner in which heading/course vectors may be determined based on position information. For example, each of points $401a$, $401b$, $401c$, $401d$, $401e$ and $401f$ may correspond to positions of a vehicle detected at 1 second intervals. To determine the vehicle's heading/course at a particular point such as point $401b$, the system may draw a vector $403a$ between an immediately previous position $401a$ and a current position $401b$ and determine an angle of this vector $403a$ relative to a reference line, such as magnetic north $405$. The determined angle may thus represent the heading/course of the vehicle at the corresponding point. For example, the heading/course at point $401b$, as identified by vector $403b$, may be determined to be 10° relative to magnetic north $405$. This process may be performed for each position $401c$, $401d$, $401e$, and $401f$ within the sliding window to identify corresponding vectors $403b$, $403c$, $403d$ and $403e$ and headings/course, respectively.

Figure 4B:
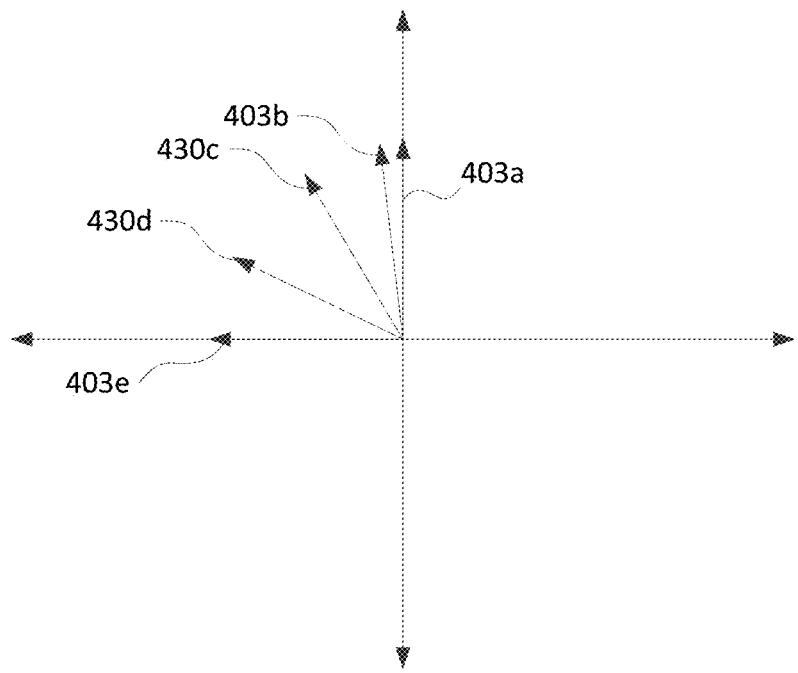
FIG. 4B illustrates a graph of vehicle headings or course according to one or more aspects described herein.

FIG. 4B illustrates how the vectors are then processed to evaluate whether the vehicle has registered a turn. As discussed, a difference between the headings/courses of each pair of vectors $403a$, $403b$, $403c$, $403d$ and $40e$ may be calculated. These differences may then be summed in both signed and unsigned manners to generate values for comparison to various thresholds and conditions in determining whether a turn has been made and a direction of the turn. In the illustrated example, the unsigned sum of the headings is 90° which is greater than the illustrative turn detection threshold of 58°, while the signed sum of the vehicle headings is −90°, indicating a left turn.

The detection of vehicle movements such as turns may assist in developing a database of information relating to risks such as risk of loss in an insurance context. Accordingly, when evaluating an individual for insurance coverage, a system may consider various characteristics of a user's driving behavior and compare these characteristics against the database associating risk of loss with various types of driving behavior or other characteristics.

Figure 5:
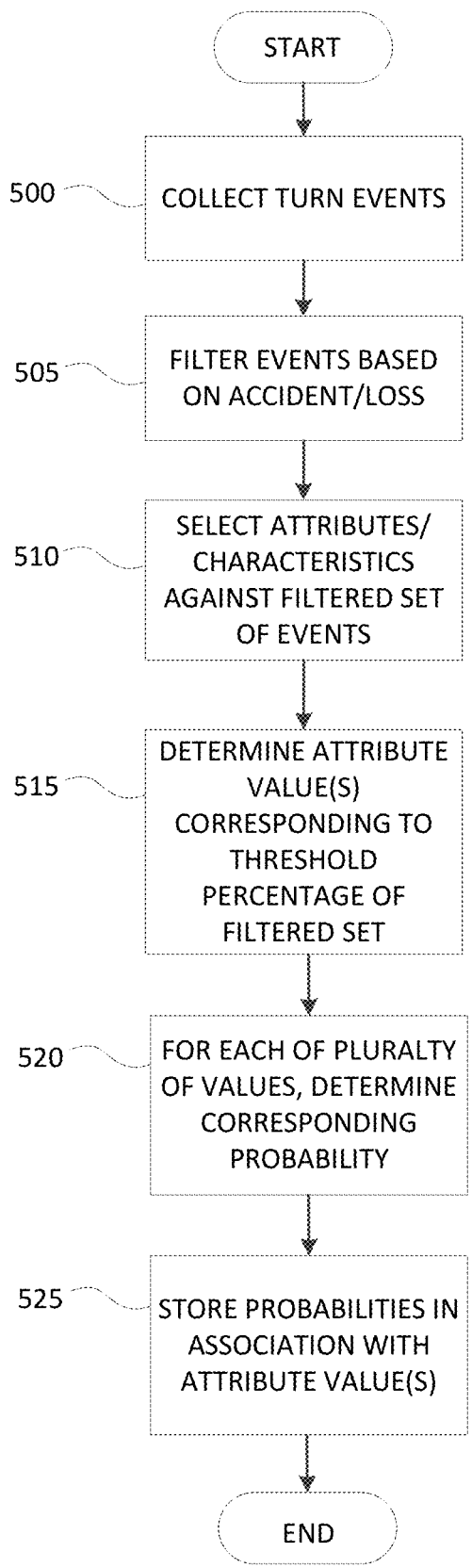
FIG. 5 is a flowchart illustrating an example process for correlating risk with vehicle activity according to one or more aspects described herein.

FIG. 5 is a flowchart illustrating a process for determining correlations between driving behavior and risk of loss. In step 500, a system may collect a plurality of turn events registered for one or more vehicles. For example, an insurance system may identify multiple turns registered for multiple vehicles insured by that entity. In step 505, the system may then filter the turn events down to those that have been associated with a loss event. For example, based on the collected data as discussed herein, the system may identify turns where an accident (or other loss event) occurred within the turning period or within a predefined amount of time of the turn event. Loss events may be detected using the sensor data collected from the turning vehicle or from one or more vehicles within a specified proximity. Moreover, loss events may be filtered based on a distance from the turning vehicle so that accidents or other loss events that are sufficiently remote from the turning vehicle are not associated. In one example, only sensor data collected for a particular area (e.g., 300 yard radius) around the vehicle may be used in identifying loss events (or other events). A time proximity may also be applied to filter events or data. Accordingly, only events occurring or data collected within a specified time period of a vehicle movement (e.g., a turn event) might be evaluated against the movement.

In step 510, the system may subsequently select a set of one or more characteristics or attributes to compare against the filtered set of turns associated with an accident. In some examples, a set of attributes may be pre-determined based on empirical studies showing that, for example, speed, turn rate, rate of acceleration, rate of deceleration, direction of turn and the like may be significant factors in whether a loss event occurs. In step 515, the system may, for each attribute, determine a value or range of values of that attribute exhibiting at least a threshold percentage of loss events, e.g., a threshold percentage of the filtered population of turn events. In one example, the system may apply a threshold of 75% and determine a range of turn rates that encompasses 75% of the loss-associated turn events. In another example, the system may apply a threshold of 80% for determining a rate of deceleration (or range of rates) that covers 80% of the loss-associated turn events. The same or different probabilities/percentages may be applied for the different attributes. Alternatively or additionally, the system may determine a probability for a set of values of each attribute in step 520. For example, a probability of a loss event may be determined for every 5 mph speed range (e.g. 1-5 mph, 6-10 mph, 11-15, mph, 16-20 mph, etc.) using the filtered data set of turn events. In another example, a probability of a loss event may be determined for multiple turn rate ranges. In a particular example, a first loss probability for turn rates 1-5 degrees per second may be determined based on the filtered turn data, while a second loss probability for turn rates of 6-10 degrees per second may be determined. These probabilities/risks may then be stored in step 525 for future lookup and use.

Risk of loss may also be calculated based on non-movement attributes including driver attributes, such as age, driving experience, and driving infraction history, as well as geographic variables, such as location, population and the like. In one example, a risk of loss may be calculated for various age groups such as 18-21, 22-29, 30-35 and the like. Alternatively or additionally, risk of loss may also be calculated for different locations (e.g., cities, jurisdictions, zip codes, etc.). Additionally or alternatively, loss events or attributes contributing to a loss event might further be associated with a cost. These costs might be determined based on the cost of replacement, cost of repair or the like and/or combinations thereof. Such costs might be used in calculating a premium for a driver.

Figure 6:
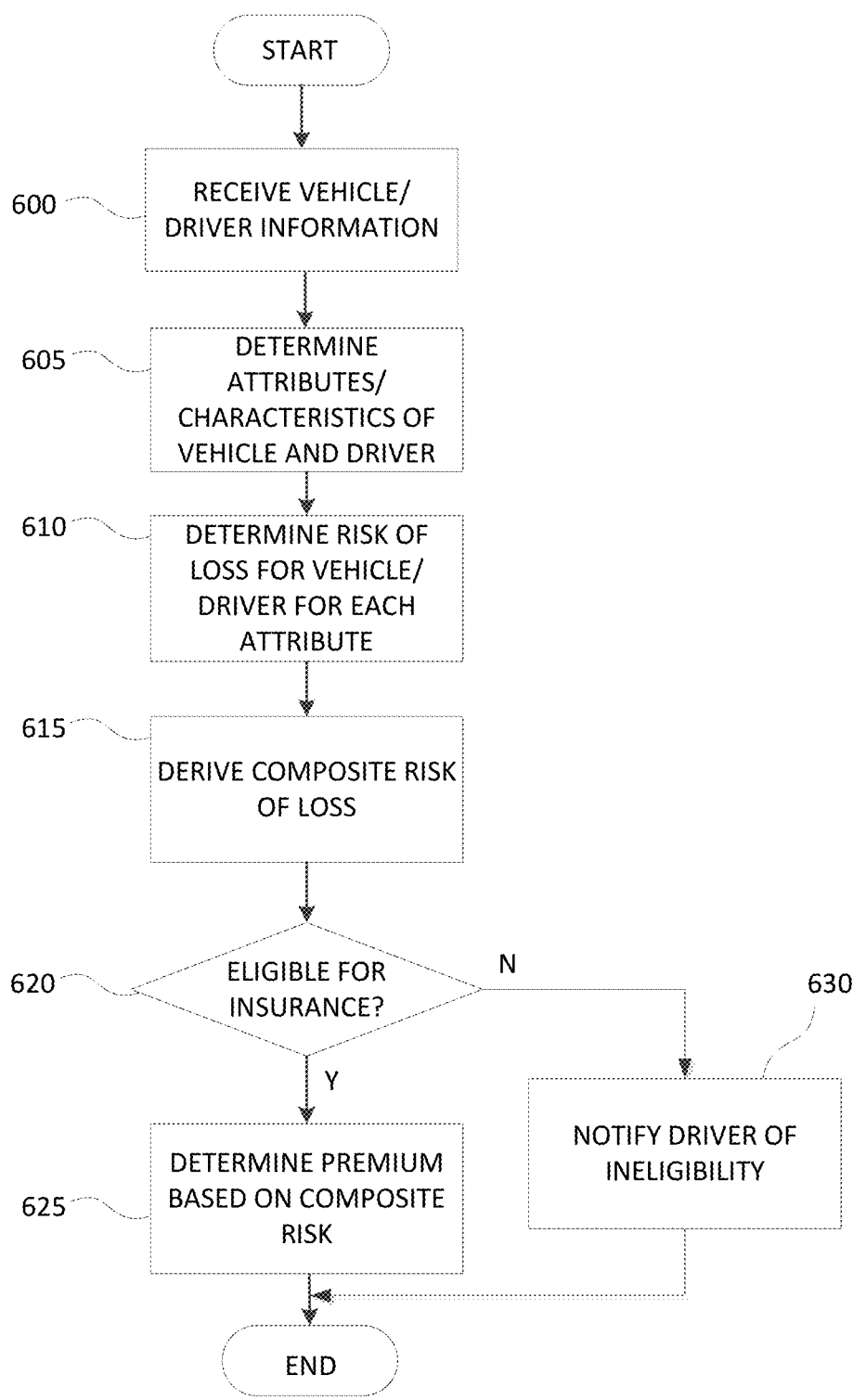
FIG. 6 is a flowchart illustrating an example for determining insurance eligibility and premiums according to one or more aspects described herein.

Once risks of loss have been determined for the desired variables, a system may use this information in a variety of ways, including evaluating insurability of a vehicle or driver, calculating an overall risk for covering a particular vehicle or driver, determining an insurance premium, predicting accidents or other loss events and the like. FIG. 6 illustrates an example process by which loss probability information may be applied. In step 600, for example, an insurance system may receive information regarding a vehicle and a driver. The information may be received as part of an insurance quote request in one configuration. In step 605, the system may determine one or more attributes of the vehicle and/or driver. In some examples, the system may retrieve driving behavior information of the driver based on public records or previously recorded driving data if, for instance, the driver or vehicle is currently insured by the same entity. Various other vehicle and driver attributes have been described throughout this disclosure. In step 610, the system may determine a risk of loss associated with each of the one or more attributes. If multiple attributes are used, the system may derive a composite risk of loss in step 615 by combining the risks determined for each of the attributes. The risks may be combined by calculating a multiplicative product of the risks, averaging the risks (with or without weighting) and/or other algorithms. Based on the determined risk of loss or combined risk of loss, the system may then determine whether the driver or vehicle meets an insurability threshold in step 620. If so, the system may further determine an insurance premium based on the level of risk associated with the vehicle and/or driver in step 625. For example, the premium may increase linearly or multiplicatively based on the associated risk. If, on the other hand, the system determines that the driver or vehicle does not meet the insurability threshold, the system may respond to the driver with a notification of the same in step 630. In some examples, the system may provide an explanation or details for the denial of coverage, such as the risk of loss being too high. The system may also provide detailed information including various driver characteristics or driver history that negatively impacted the determination.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, the processes, systems, apparatuses and other aspects of the present disclosure have been described with respect to insurance processing for buildings. However, the same or similar features may be applied to a variety of contexts including product sales, service offerings, real estate and the like.

What is claimed is:

1. A turn detection apparatus comprising:
   a communication interface;
   a processor; and
   memory storing computer readable instructions that, when executed by the processor, cause the turn detection apparatus to:
   detect, using at least one sensor of a vehicle, a triggering vehicle event;
   initiate a sliding heading detection window defined by a specified amount of time;
   detect a plurality of headings of the vehicle during the sliding heading detection window, each of the headings corresponding to a different point in time;
   determine at least one movement characteristic of the vehicle based on the plurality of headings of the vehicle detected during the sliding heading detection window; and
   determine a risk of loss associated with at least one of the vehicle and a driver of the vehicle based on the determined at least one movement characteristic of the vehicle.

2. The turn detection apparatus of claim 1, wherein the communication interface includes a mobile communication device.

3. The turn detection apparatus of claim 1, wherein the communication interface is configured to be physically connected to the vehicle, and
   wherein determining the at least one movement characteristic of the vehicle is further based on one or more sensor readings obtained from a sensor of the turn detection apparatus.

4. The turn detection apparatus of claim 1, wherein detecting the plurality of headings of the vehicle is performed using signal triangulation.

5. The turn detection apparatus of claim 1, wherein determining at least one movement characteristic of the vehicle includes determining that the vehicle has registered a turn based on a total turn angle, detected using the plurality of headings, being above a specified threshold angle.

6. The turn detection apparatus of claim 1, wherein the at least one characteristic of the turn of the vehicle includes a speed of the turn.

7. The turn detection apparatus of claim 6, wherein the at least one characteristic of the turn includes a rate of acceleration.

8. The turn detection apparatus of claim 3, wherein the at least one sensor includes a camera.

9. The turn detection apparatus of claim 1, wherein determining the risk of loss includes calculating a probability of loss based on historical loss data associated with turns having the at least one characteristic.

10. The turn detection apparatus of claim 1, wherein the turn detection apparatus is further caused to:
    detect a loss event within a predefined amount of time of a turn of the vehicle; and
    assign a value of the loss event to at least one characteristic of the turn.

11. The turn detection apparatus of claim 10, wherein detecting the loss event includes determining whether the loss event is within a predefined proximity of a location of the turn.

12. The turn detection apparatus of claim 11, wherein the loss event corresponds to another vehicle different from the vehicle registering the turn.

13. A method comprising:
    detecting, by a turn detection apparatus using at least one sensor of a vehicle, a triggering vehicle event;
    initiating, by the turn detection apparatus, a sliding heading detection window defined by a specified amount of time;
    detecting, by the turn detection apparatus, a plurality of headings of the vehicle during the sliding heading detection window, each of the headings corresponding to a different point in time;
    determining, by the turn detection apparatus, at least one movement characteristic of the vehicle based on the plurality of headings of the vehicle detected during the sliding heading detection window; and
    determining, by the turn detection apparatus, a risk of loss associated with at least one of the vehicle and a driver of the vehicle based on the determined at least one movement characteristic of the vehicle.

14. The method of claim 13, wherein detecting the plurality of headings includes obtaining positioning information through a global positioning system (GPS) receiver.

15. The method of claim 13, wherein the turn detection apparatus comprises a first position detection device and a second position detection device, and
wherein the method further comprises modifying a data collection rate during the sliding heading detection window depending on at least one of a signal strength of the first position detection device and a signal strength of the second position detection device.

16. The method of claim 15, wherein modifying the data collection rate includes:
increasing a data collection rate of the first position detection device; and
decreasing a data collection rate of the second position detection device.

17. A non-transitory computer readable medium storing computer readable instructions that, when executed by a processor, cause a turn detection apparatus to:
detect, using at least one sensor of a vehicle, a triggering vehicle event;
initiate a sliding heading detection window defined by a specified amount of time;
detect a plurality of headings of the vehicle during the sliding heading detection window, each of the headings corresponding to a different point in time;
determine at least one movement characteristic of the vehicle based on the plurality of headings of the vehicle detected during the sliding heading detection window; and
determine a risk of loss associated with at least one of the vehicle and a driver of the vehicle based on the determined at least one movement characteristic of the vehicle.

18. The non-transitory computer readable medium of claim 17, wherein the turn detection apparatus is further caused to determine whether the vehicle has turned based on whether a total turn angle, determined using the plurality of headings, is above a specified threshold angle.

19. The non-transitory computer readable medium of claim 17, wherein the at least one characteristic includes a rate of acceleration.

20. The non-transitory computer readable medium of claim 17, wherein the at least one characteristic includes a direction of a turn.

* * * * *